(12) United States Patent
Baek et al.

(10) Patent No.: US 10,341,848 B2
(45) Date of Patent: Jul. 2, 2019

(54) PROFILE PROVISIONING METHOD AND APPARATUS

(71) Applicant: Samsung Electronics Co., Ltd., Suwon-si, Gyeonggi-do (KR)

(72) Inventors: Youngkyo Baek, Seoul (KR); Duckey Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 13 days.

(21) Appl. No.: 15/843,287

(22) Filed: Dec. 15, 2017

(65) Prior Publication Data

US 2018/0176768 A1  Jun. 21, 2018

(30) Foreign Application Priority Data

Dec. 16, 2016 (KR) .................. 10-2016-0172258

(51) Int. Cl.
*H04W 8/20* (2009.01)
*H04W 8/18* (2009.01)
*H04W 88/02* (2009.01)
*H04W 4/20* (2018.01)
*H04W 48/18* (2009.01)
*H04W 48/08* (2009.01)

(52) U.S. Cl.
CPC .......... *H04W 8/205* (2013.01); *H04W 8/183* (2013.01); *H04W 4/20* (2013.01); *H04W 8/18* (2013.01); *H04W 48/08* (2013.01); *H04W 48/18* (2013.01); *H04W 88/02* (2013.01)

(58) Field of Classification Search
CPC . H04W 52/0254; H04W 48/16; H04W 48/18; H04W 68/00
See application file for complete search history.

(56) References Cited

U.S. PATENT DOCUMENTS

| 9,894,009 B2* | 2/2018 | Bentley .................. G06F 9/452 |
| 9,894,420 B2* | 2/2018 | Patterson ........... H04N 21/6582 |
| 2010/0323727 A1* | 12/2010 | Russell ............... H04W 36/385 455/466 |
| 2013/0304616 A1* | 11/2013 | Raleigh ................ G06Q 20/145 705/34 |
| 2015/0281942 A1* | 10/2015 | Lee ....................... H04W 48/16 455/434 |
| 2016/0007188 A1 | 1/2016 | Wane |
| 2016/0020804 A1 | 1/2016 | Lee et al. |
| 2016/0119780 A1 | 4/2016 | Jung et al. |
| 2017/0245176 A1* | 8/2017 | Murphy ................ H04W 28/08 |

* cited by examiner

*Primary Examiner* — Khalid W Shaheed
(74) *Attorney, Agent, or Firm* — Jefferson IP Law, LLP

(57) ABSTRACT

A profile provisioning method of a terminal is provided. The method includes transmitting a request message to a market server to request information on subscription plans offered by at least one operator, receiving a response message including the information on the subscription plans offered by the at least one operator from the market server, and displaying a subscription plan list based on the information on the subscription plans offered by the at least one operator, the subscription plan list presenting the subscription plans in an order of priority.

16 Claims, 9 Drawing Sheets

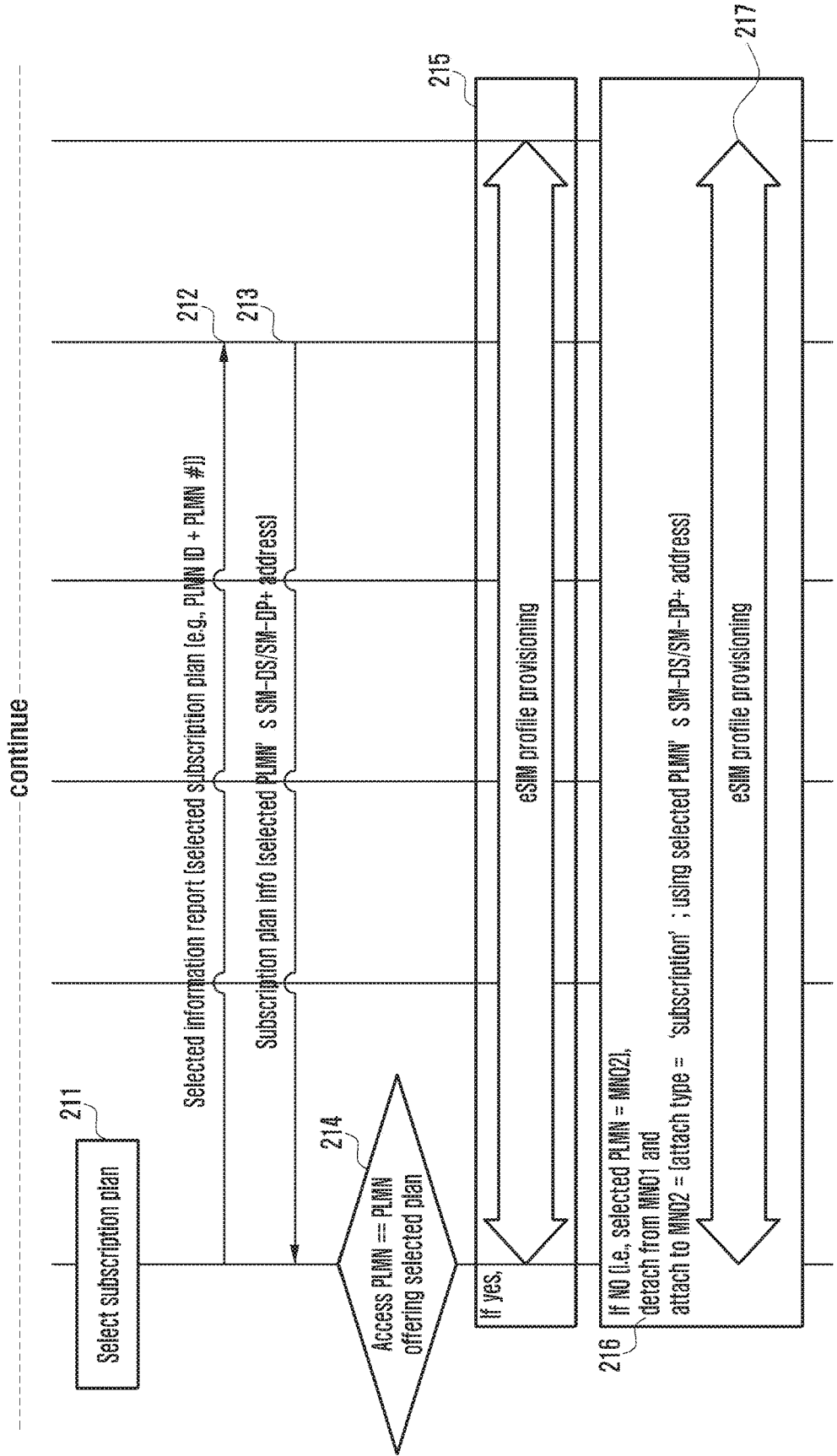

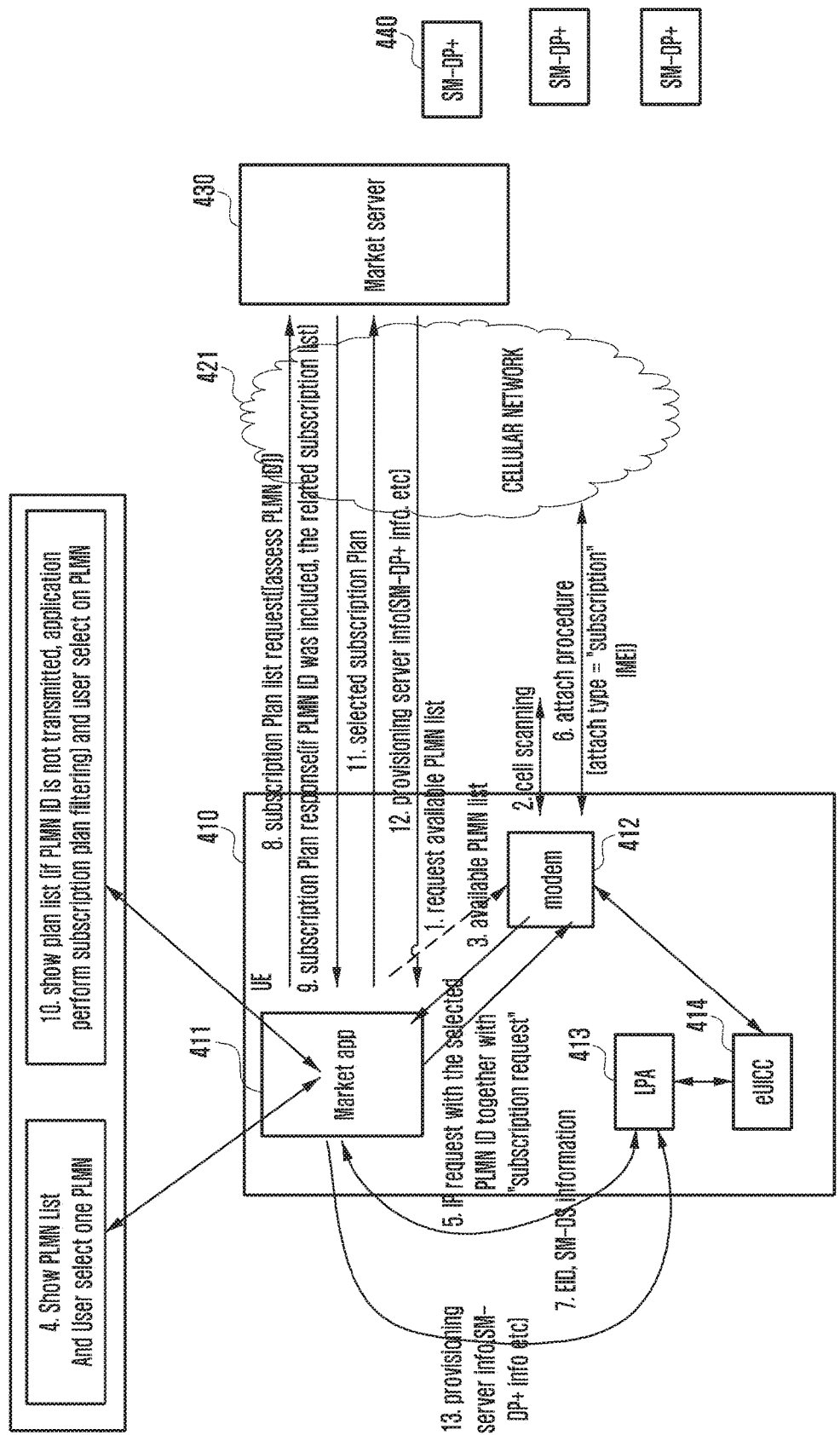

PROFILE PROVISIONING METHOD AND APPARATUS

CROSS-REFERENCE TO RELATED APPLICATION(S)

This application claims the benefit under 35 U.S.C. § 119(a) of a Korean patent application filed on Dec. 16, 2016 in the Korean Intellectual Property Office and assigned Serial number 10-2016-0172258, the entire disclosure of which is hereby incorporated by reference.

TECHNICAL FIELD

The present disclosure relates to a method and apparatus for downloading a profile via a market server in a communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System.' The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, a moving network, cooperative communication, coordinated multi-points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and Big Data processing technology through connection with a cloud server, has emerged. As technology elements, such as "sensing technology," "wired/wireless communication and network infrastructure," "service interface technology," and "Security technology" have been demanded for IoT implementation, a sensor network, machine-to-machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including a smart home, a smart building, a smart city, a smart car or connected cars, a smart grid, health care, smart appliances, and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and M2M communication may be implemented by beamforming, MIMO, and array antennas. Application of a cloud radio access network (RAN) as the above-described Big Data processing technology may also be considered to be as an example of convergence between the 5G technology and the IoT technology.

Meanwhile, a universal integrated circuit card (UICC) is a smart card for use in mobile communication terminals. The UICC may include an access control module for access to a mobile operator's network. Examples of the access control module include a subscriber identity module (SIM), a universal SIM (USIM), and an internet protocol (IP) multimedia service identity module (ISIM). The UICC including a USIM is usually called a USIM card. Likewise, the UICC including an SIM is called an SIM card. In the following description, the term "SIM card" is used to cover the UICC card, USIM card, and UICC including ISIM. That is, the same technical approach can be applied to all of the SIM, USIM, ISIM, and other types of UICC.

An SIM card contains mobile communication subscriber information for use in subscriber authentication and traffic security key generation so as to make it possible for the subscriber to use a secure mobile communication service.

Typically, SIM cards are manufactured on demand from mobile network operators in an operator-specific manner; thus, a manufactured SIM card contains the authentication information (e.g., USIM application, IMSI, subscription permanent identifier (SUPI), K value, and OPc value) for use in access to the corresponding operator's network. The mobile network operator delivers the SIM cards supplied by the manufacturer to the subscribers. Afterward, the mobile network operator may manage the information in such a way of installing, updating, and deleting an application in the UICC using an over the air (OTA) technology. A subscriber may insert the SIM card into a mobile communication terminal for use of the corresponding mobile operator's network and application services. The SIM card makes it possible for the subscriber to use the authentication information, contact information, and phone book stored therein even when the subscriber changes the old mobile communication terminal for a new one.

However, the traditional concept of an SIM card may cause inconvenience when the subscriber attempts to use services provided by other mobile network operators. This means that acquisition by the subscriber of a physical SIM card is cumbersome. For example, a subscriber who travels abroad has to purchase a local SIM card to use a communication service provided by a local mobile network operator. Although it may be possible to mitigate such inconvenience by subscribing to a roaming service, the roaming service is restrictive because the roaming service rate is likely to be high and there may even be no roaming agreement between the network operators.

In order to solve the inconvenient problems discussed above, download of an SIM remotely and installing the SIM in the SIM card could be considered. In this approach, the user may download an SIM for use in a certain mobile operator's network in the SIM card anytime. It may also be possible for the user to download and install a plurality of SIMs and use one of the SIMs selectively. Meanwhile, the SIM card may be provided in the form of a fixed part or a detachable part. In particular, the UICC fixed in a terminal is called embedded UICC (eUICC), which may be configured to download a plurality of SIMs remotely for selective use thereof. In the following description, the SIM card that is capable of downloading and installing a plurality of remotely downloaded SIMs is referred to as an eUICC or an embedded SIM (eSIM) card. That is, SIM cards that are capable of installing multiple remotely-downloaded SIMs for selective use, regardless of being provided as a fixed or detachable part of a terminal, are collectively referred to as an eUICC or an eSIM card.

In the case of an eSIM-equipped open market-oriented terminal, if it has no existing SIM profile, the terminal has to access a subscription manager data preparation plus (SM-DP+) or subscription manager discovery service (SM-DS) to download an SIM profile for receiving a cellular network service provided by a mobile operator, i.e., mobile network operator (MNO). For example, the terminal may access an SM-DP+, as a provisioning server storing SIM profiles, to download an SIM profile. The terminal may access an SM-DS, as a server providing SM-DP+ address information, to inquire about the address of the SM-DP+ storing the SIM profile of the terminal and then download the SIM profile from the SM-DP+. In order to achieve this, there is a need of a method for providing a packet data network (PDN) connectivity or packet data unit (PDU) connectivity service that makes it possible for a terminal to access an eSIM server through a cellular network.

Particularly when a user has a terminal that is not registered with any network operator, it may be possible to provision an SIM profile in a payment plan subscription process which begins when the terminal powers on. In order for the user to check for payment plans of network operators and select a preferred payment plan, an alliance of device manufacturers and/or network operators or a $3^{rd}$ party provider may manage a market of payment plans offered by network operators.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a subscriber identification module (SIM) profile provisioning method and apparatus of a terminal that is capable of allowing the terminal to select one of payment plans of multiple network operators provided in a market or by a market server via a cellular network and downloading to provision an SIM profile according to the selected payment plan.

In accordance with an aspect of the present disclosure, a profile provisioning method of a terminal is provided. The method includes transmitting a request message to a market server to request information on subscription plans offered by at least one operator, receiving a response message including the information on the subscription plans offered by the at least one operator from the market server, and displaying a subscription plan list based on the information on the subscription plans offered by the at least one operator, the subscription plan list presenting the subscription plans in an order of priority.

In accordance with another aspect of the present disclosure, a terminal is provided. The terminal includes a universal integrated circuit card (UICC), a display, a transceiver configured to transmit and receive signals, and at least one processor configured to control the transceiver to transmit a request message to a market server to request information on subscription plans offered by at least one operator, control the transceiver to receive a response message including the information on the subscription plans offered by the at least one operator from the market server, and control the display to display a subscription plan list based on the information on the subscription plans offered by the at least one operator, the subscription plan list presenting the subscription plans in an order of priority.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A and 2B are a signal flow diagram illustrating an SIM profile provisioning method of an eSIM-equipped user equipment (UE) according to an embodiment of the present disclosure;

FIG. 4 is a diagram illustrating an internal operation of an eSIM-equipped UE for connecting to a market server and selecting a subscription plan according to an embodiment of the present disclosure;

Throughout the drawings, it should be noted that like reference numbers are used to depict the same or similar elements, features, and structures.

DETAILED DESCRIPTION

Figure 1:
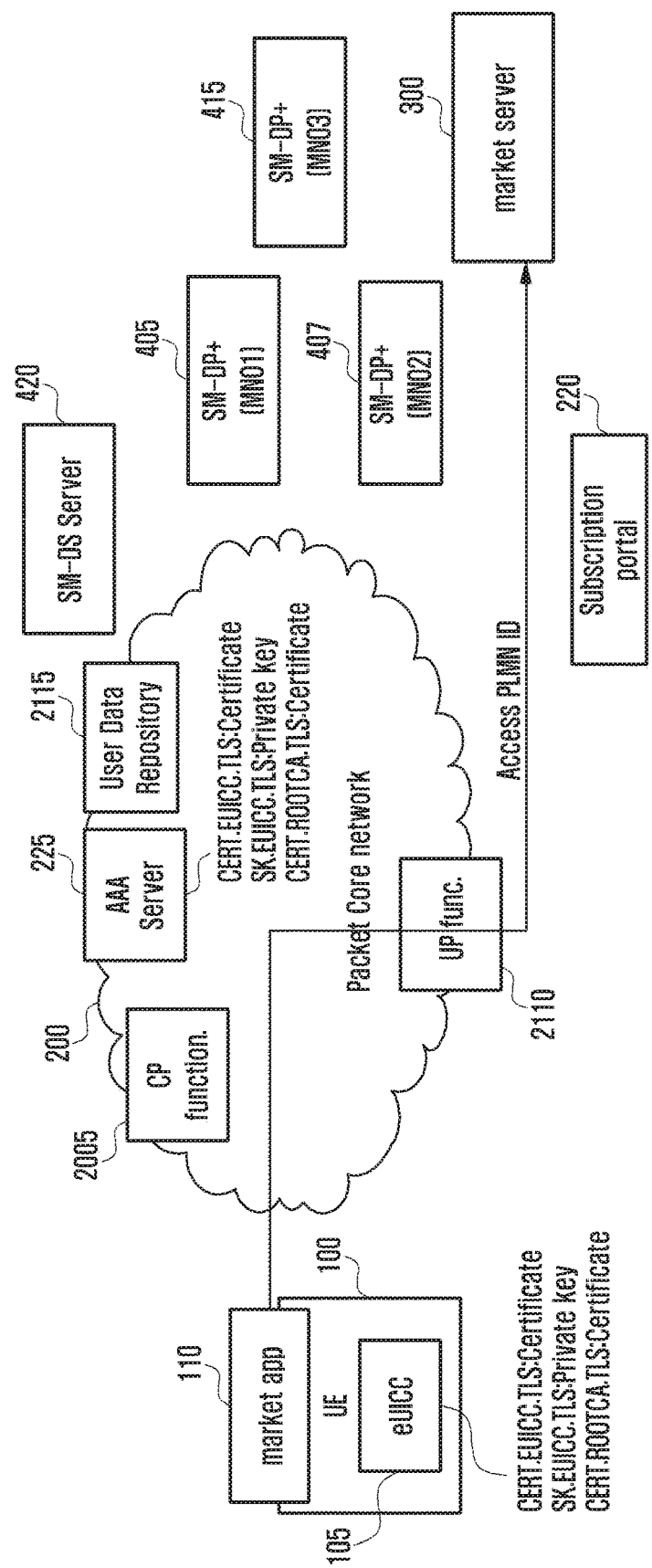
FIG. 1 is a schematic diagram illustrating network architecture for provisioning a subscriber identity module (SIM) profile into an embedded SIM (eSIM)-equipped terminal via a market server according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the detailed description of the present disclosure below, it may be advantageous to set forth definitions of certain words and phrases used throughout the specification. However, it should be noted that the words and phrases are not limited to the exemplary interpretations herein.

In the case that an eSIM-equipped open market-oriented terminal has no existing SIM profile, the terminal has to download a subscriber identification module (SIM) profile from an eSIM server, e.g., SM-DP+ or SM-DS, to receive a cellular network service. For example, the terminal may access an SM-DP+, as a provisioning server managing SIM profiles, to download an SIM profile or an SM-DS, as a server providing SM-DP+ address information, to inquire about the address of the SM-DP+ storing the SIM profile of the terminal and then to download the SIM profile from the SM-DP+.

In order to achieve this, there is a need of a method for providing a user with packet data network (PDN) connectivity or a packet data unit (PDU) connectivity through a cellular network. In a conventional method, the terminal with no existing SIM profile can achieve a connectivity via tethering or a Wi-Fi network. However, if it has no pre-existing connectivity, the terminal cannot achieve connectivity. In the case that a device manufacturer sells terminals equipped with an eSIM containing a provisioning profile, it may be possible to achieve limited connectivity to a cellular network and download an SIM profile using the provisioning profile. However, this approach increases the price of the terminal.

Typically, a terminal selects an operator in a cellular network access procedure and, in this case, the user is provided payment plans of only the currently connected operator and thus is restricted in freedom of choice even though there are more diverse payment plans proposed by many network operators. Furthermore, the different network operators' subscription portals that are provided with different user interfaces (UIs) make it difficult for the user to become familiar therewith and to opt for an optimal payment plan and, even after selecting a network operator, the user has to select a payment plan through the subscription portal of a certain network operator, download an SIM profile, and activate the SIM profile manually.

Various embodiments of the present disclosure propose an SIM profile handling method that is capable of allowing a terminal equipped with an eSIM containing no SIM profile to access a market server through a cellular network, select an operator/payment plan, download an SIM profile based on information provided by the market server in association with the selected operator/payment plan, and activate the downloaded SIM profile.

FIG. 1 is a schematic diagram illustrating network architecture for provisioning an SIM profile into an eSIM-equipped terminal via a market server according to an embodiment of the present disclosure.

Referring to FIG. 1, a user equipment (UE) 100 is equipped with an embedded universal integrated circuit card (eUICC) 105 for use of an eSIM, and a market application (APP) 110 for SIM provisioning is installed in the UE 100.

The UE 100 may access a packet core network 200 to achieve connectivity and connect to a market server 300 to select an operator and a subscription plan. According to an embodiment of the present disclosure, the UE 100 may send to the market server 300 the information on the currently connected public land mobile network (PLMN) such that the market server 300 provides the subscription plans of the connected PLMN preferentially in comparison with those of other PLMNs.

The UE 100 may acquire the information on an eSIM server (which is interchangeably referred to as provisioning server or profile server) (e.g., one of SM-DP+ servers 405, 407, and 415 and SM-DS server 420) offering the selected subscription plan and download an SIM profile corresponding to the mobile network operator (MNO) providing a data service from the eSIM server (e.g., SM-DP+ server), the SIM profile being provisioned into the eUICC 105 of the UE 100.

The packet core network 200 which the UE 100 accesses to acquire connectivity may be a cellular network supporting data communication, e.g., evolved packet system (EPS) for LTE and 5G network. In the case of LTE, the packet core network 200 may include mobility management entities (MMEs) and gateways (GWs). In the case of the 5G network, the packet core network 200 may include a control plane (CP) function 2005 responsible for mobility management and session management and a user plane (UP) function 2110 responsible for user data forwarding such as a packet data gateway. The CP function 2005 may act as an authenticator for triggering an extensible authentication protocol (EAP) authentication procedure and may manage security context for encrypting signaling messages after authentication.

The user data repository 2115 may store subscriber information (e.g., ID of the eUICC (i.e., EID) of a registered UE), addresses of eSIM servers (e.g., SM-DP+), a whitelist containing EIDs of allowed eUICCs, and/or a blacklist containing EIDs of barred eUICCs. The user data repository 2115 may be an entity responsible for providing the address of an SM-DP+ storing SIM profiles or determining whether the eUICC is allowed based on the aforementioned information.

Subscription portal 220 is a subscription portal server which a user accesses to select an intended subscription plan. The authentication, authorization, and accounting (AAA) server 225 has its own certificate, a private key, and a certificate of root certificate authority (CA) for authenticating the eUICC.

According to the eUICC authentication policy of the MNO, the AAA server 225 may be established based on an eUICC and shared trust rather than any certificate. The AAA server 225 may not be used in the network of an MNO which does not support authentication.

Also, the eUICC 105 may have its own certificate, a private key, and a certificate of the root CA.

Figure 2A:
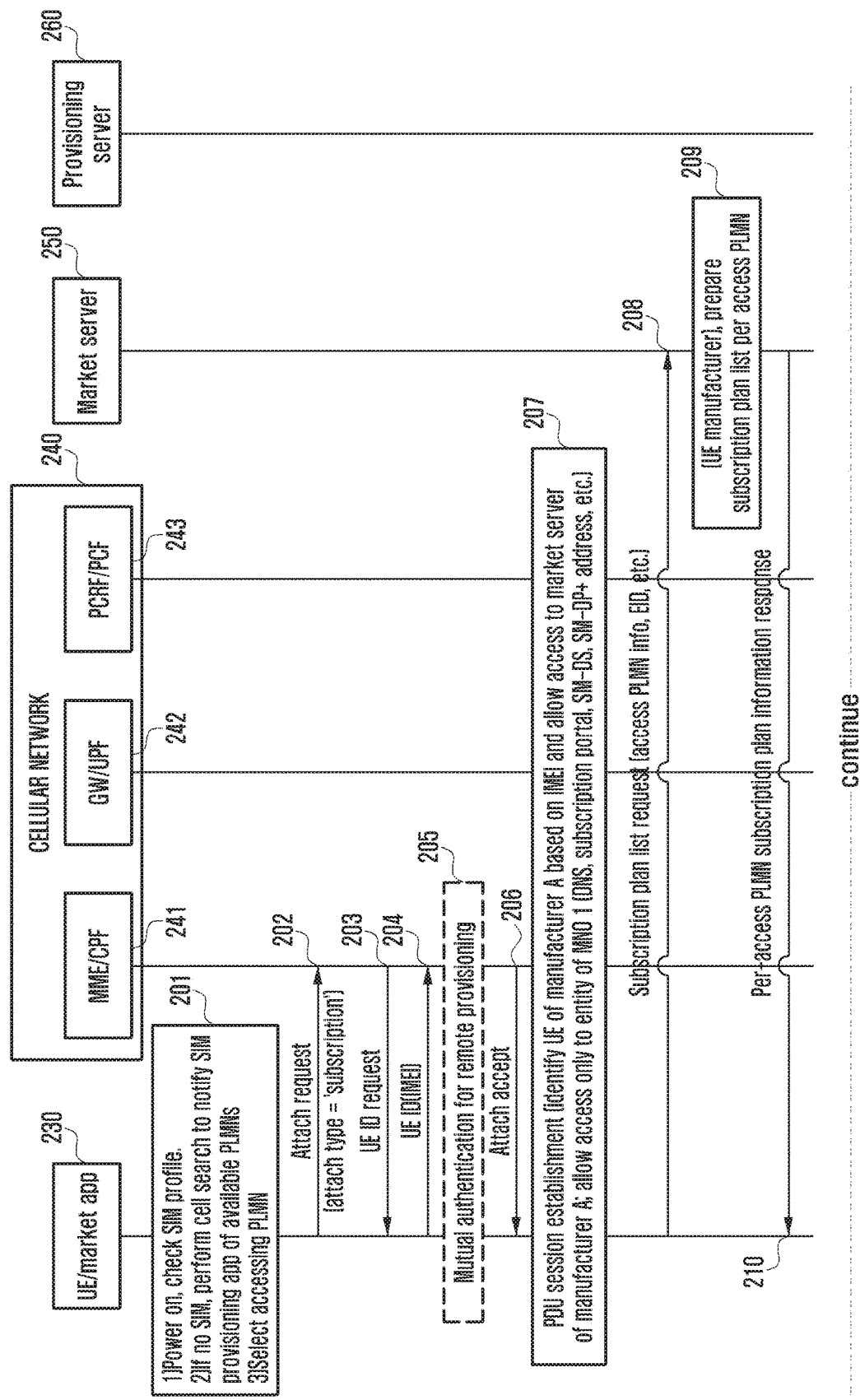

FIGS. 2A and 2B are a signal flow diagram illustrating an SIM profile provisioning method of an eSIM-equipped UE according to an embodiment of the present disclosure.

Referring to FIGS. 2A and 2B, a UE 230 with no existing SIM profile may connect to a cellular network 240 to acquire connectivity, access a market server 250 to select a subscription plan, and download an SIM profile via an eSIM server or a provisioning server 260 (which may also be referred to as a profile server).

In this embodiment, the cellular network 240 may include at least one of LTE and 5G network entities. The cellular network 240 may include at least one of an MME, a gateway (GW), and a policy and charging rules function (PCRF) as the LTE network entities. The cellular network 240 may also include at least one of a control plane function (CPF), a user plane function (UPF), and a policy control function (PCF). The MME is responsible for the session management function (SMF) related to PDN connection control as well as the UE registration, authentication, and mobility management functions. In the case of the 5G network, the CPF is responsible for the functions of the LTE MME and it may include an authentication function (AUF) responsible for UE authentication, an access and mobility management function (AMF) responsible for registration and mobility management, and an SMF responsible for PDU connection control.

The GW is responsible for relaying user data packets from the UE to a data network, packet filtering for delivering data packets to the addressed UE, and allocating an IP address to the UE. In the case of the 5G network, the UPF is responsible for the functions of a gateway such as relay of user data packets from the UE to the data network and packet filtering for delivery of the packets to the addressed UE. Unlike the LTE network, however, the IP address allocation function may be performed by the SMF. The PCRF is responsible for quality of service (QoS) and charging functions in the communication network by providing the GW with the QoS policy or charging policy, and a PCF 243 may be configured to provide the UPF with QoS and charging policies such that the UPF performs QoS and charging functions via the SMF.

Although the description is made with an exemplary configuration of a 5G network, the present disclosure is applicable to the LTE network in a similar manner.

At operation 201, the UE 230 powers on and checks presence/absence of any SIM profile. If there is no SIM profile, the UE 230 detects the necessity of SIM profile provisioning and attempts to achieve PDU connectivity. If the UE 230 determines or is preconfigured to perform a PDU connectivity procedure, it may provide a list of available PLMNs discovered through cell search to an application or entity responsible for SIM profile provisioning. The UE 230 may select a PLMN for SIM profile provision from the available PLMN list.

The UE 230 may make a PLMN selection in accordance with a user input or a predetermined priority rule. For example, if the user has already determined a PLMN to subscribe, a provisioning application displays a list of PLMNs prompting the user to select a PLMN on a UI. Alternatively, if the information on a PLMN to subscribe is preconfigured, the UE 230 may select the corresponding PLMN. Alternatively, the UE 230 may select a PLMN with the strongest signal strength or randomly among the available PLMNs or a PLMN with the highest priority among the available PLMNs according to a preconfigured priority rule. The provisioning application is configured for access to a market server and thus may be called a market application.

At operation 202, the UE 230 may transmit an attach request message to a CPF 241 through the selected PLMN to request for connection to the network. The attach request message may include attach type information indicating the attach request that is made for service plan subscription and SIM file provisioning. For example, the type information may be transmitted in the form of attach type='subscription.' In the UE 230, a non-access stratum (NAS) entity may transmit to an access stratum (AS) entity the attach request message including the information indicative of SIM provisioning as the cause of the request. The information indicative of SIM provisioning may be transmitted to a base station for use in selecting a CPF.

The attach request message may also include an identifier of the UE 230 (UE ID), e.g., international mobile station equipment identity (IMEI) and permanent equipment identifier (PEI). Alternatively, upon receipt of the attach request message, the CPF 241 may transmit a UE ID request message to the UE 230, at operation 203, and the UE 230 may transmit the UE ID to the CPF 241, at operation 204.

If the attach request message is received, the CPF 241 or an authenticator (not shown) may perform an eUICC authentication procedure, at operation 205, for remote SIM provisioning.

After completing security key setup through the authentication procedure, the CPF 241 or the authenticator may transmit an attach accept message to the UE 230, at operation 206, to notify that the UE 230 has connected to the network successfully. The attach accept message may include the address of a subscription portal to access for subscription.

At operation 207, the UE 230 may transmit to the CPF 241 a PDU connection request message for establishing a PDU session for SIM provisioning. The PDU connection request message may include information on the type indicating that the cause of the PDU connection request is SIM provisioning. For example, the type information may be transmitted in the form of type='SIM provisioning.'

It may also be possible that the PDU connection request is piggybacked on the attach request message transmitted by the UE 230, at operation 202. If the attach request message includes attach type field set to 'subscription,' it may be possible to initiate the session establishment procedure of operation 207 for PDU connection for SIM provisioning even though there is no PDN connection request message transmission.

While the CPF 241 is processing the PDU connection request message, the SMF of the CPF 241 selects a UPF in consideration that the request is made for SIM provisioning or a UPF suitable for a selected network slice. The SMF may allocate an IP address to the UE 230.

If a UE manufacturer is identified based on the UE ID, e.g., IMEI and PEI, received from the UE 230 at the previous operation while processing the PDU connection request, a UPF 242 may make a configuration for access to the market server 250 pre-agreed with the UE manufacturer. The market server may be deployed per UE manufacturer. It may also be possible for the network operator to operate a separate market server to make a configuration for access to the corresponding market server regardless of the UE manufacturer information.

For access to the market server 250, it may be possible to configure an uplink/downlink packet filter with the market server address.

It may also be possible to make a configuration for allowing access only to the SM-DP+ server, SM-DS server for SM-DP+ discovery, DNS server, and subscription portal for SIM provisioning in the PDU session establishment procedure such that the established PDU connection is used only for the traffic related to the SIM provisioning. For example, it may be possible to configure uplink/downlink filters with the addresses for specific SIM provisioning (e.g., SM-DP+ server address, SM-DS server address, DNS server address, and subscription portal address) so as to allow only the communications attempted with the corresponding destination/source IP addresses.

After achieving the PDU connectivity, the market application of the UE 230 may transmit a subscription plan list request message to the market server 250, at operation 208, to request a list of the subscription plans of at least one network operator. The subscription plan list request message may include the information on the network to which the UE 230 has connected, e.g., access PLMN ID. The subscription plan list request message may also include at least one of the eUICC ID (EID) of the UE 230 and UE manufacturer information.

At operation 209, the market server 250 may provide a list of subscription plans arranged in an order of priority based on the received access PLMN ID. For example, the market server 250 may present the subscription plans offered by a PLMN identified by the received access PLMN ID preferentially. In the case where the market application is a universal market application rather than a manufacturer-specific market application, the market server 250 may also consider the UE manufacturer information in allocating priorities to the subscription plans. For example, the market server 250 may give a priority to the subscription plans offered by a network operator having a contract with the UE manufacturer. At operation 210, the market server 250 may transmit prioritized subscription plans to the UE 230. For example, the market server 250 may transmit a predetermined number of subscription plans filtered according to priorities among the stored subscription plans.

At operation 211, the UE 230 may select at least one of the subscription plans transmitted by the market server 250 in response to a user input or according a preconfigured setting. At operation 212, the UE 230 may transmit to the market server 250 the selected subscription plan, e.g., at least one of PLMN ID and subscription plan identifier. At operation 213, the market server 250 may transmit to the UE 230 (particularly, the market application) the information on the provisioning server 260 for remote provisioning, e.g., SM-DS server or SM-DP+ server address of the selected PLMN.

At operation 214, the UE 230 may determine whether the currently connected PLMN (access PLMN) matches the PLMN selected at operation 211 (selected PLMN) (e.g., whether the two PLMNs are identical or associated with each other).

If the access PLMN and the selected PLMN match each other, the UE 230 may connect to the provisioning server 260, at operation 215, based on the provisioning server address acquired at operation 213, to download the eSIM profile. Otherwise, if the access PLMN and the selected PLMN do not match each other, the UE 230 may detach from the access PLMN, at operation 216, and perform the attach procedure again at operation 201 for selecting a PLMN. During operation 216, the UE may attach to the PLMN selected at operation 211 by transmitting an attach request message including the attach type information in the form of attach type='subscription' to indicate the attach request that is made for SIM profile provisioning. After the attachment, the UE 230 may access the provisioning server 260, at operation 217, using the provisioning server address acquired at operation 213, and download the eSIM profile for eSIM profile provisioning.

Figure 3A:
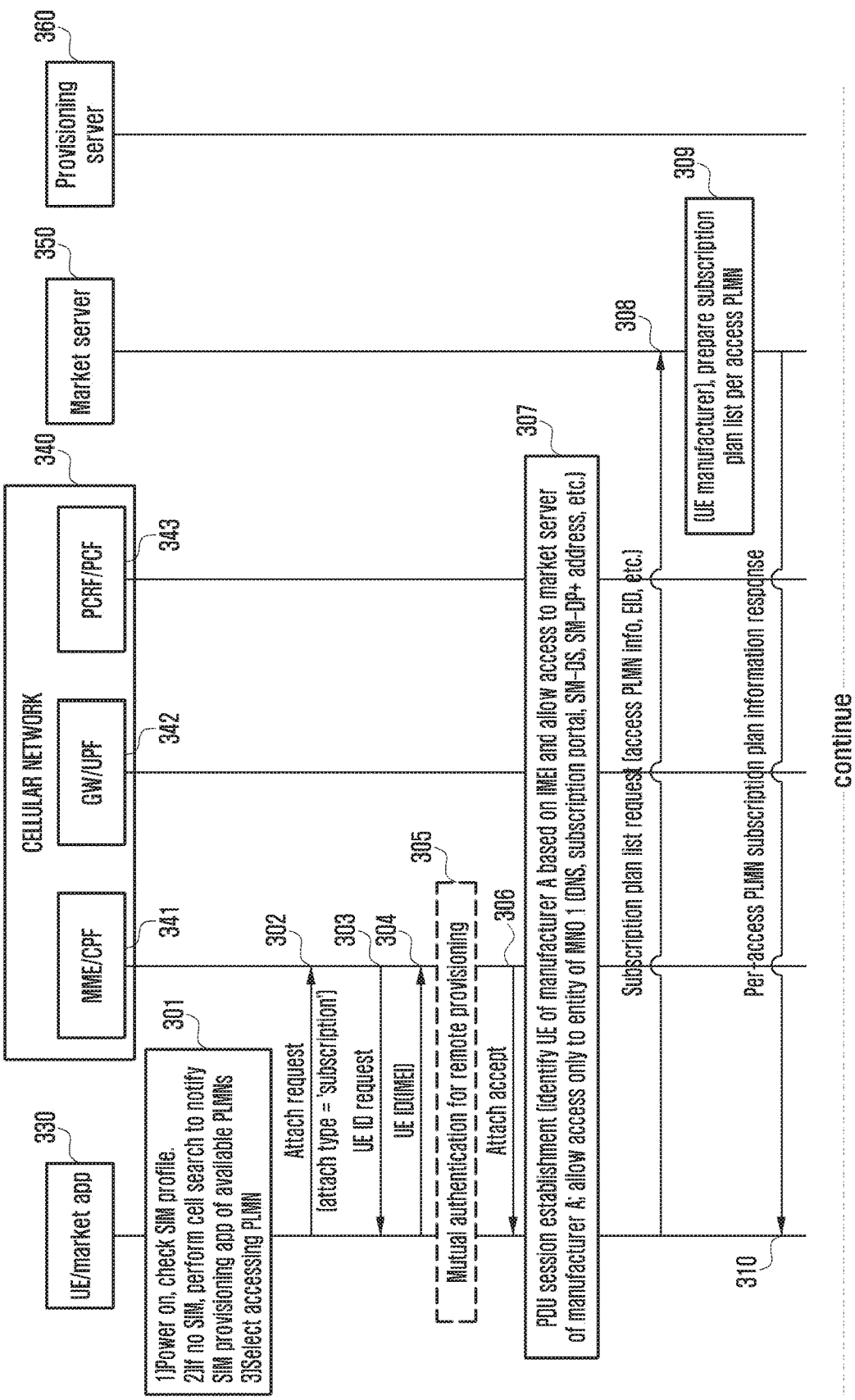
FIGS. 3A and 3B are a signal flow diagram illustrating an SIM profile provisioning method of an eSIM-equipped UE according to another embodiment of the present disclosure.
Figure 3B:
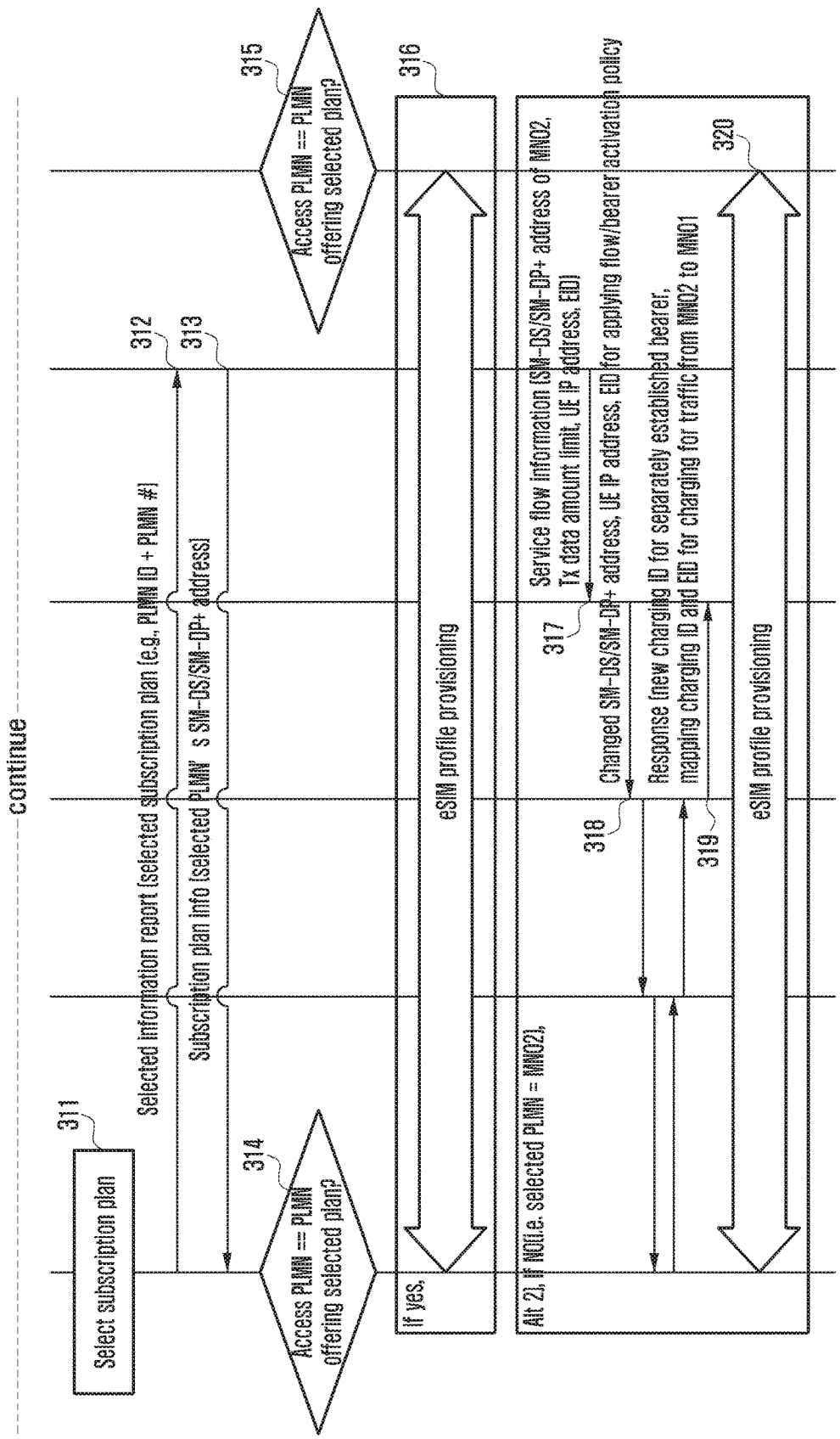

FIGS. 3A and 3B are a signal flow diagram illustrating an SIM profile provisioning method of an eSIM-equipped UE according to another embodiment of the present disclosure.

Referring to FIGS. 3A and 3B, a UE 330 with no existing SIM profile may connect to a cellular network 340 to acquire connectivity, access a market server 350 to select a subscription plan, and download an SIM profile via an eSIM server or provisioning server 360 (which may also be referred to as a profile server).

In this embodiment, the cellular network 340 may include at least one of LTE and 5G network entities. The cellular network 340 may include at least one of an MME, a GW, and a PCRF as the LTE network entities. The cellular network 340 may also include at least one of a CPF, a UPF, and a PCF as the 5G network entities. The MME is responsible for the SMF related to PDN connection control as well as the UE registration, authentication, and mobility management functions. In the case of the 5G network, the CPF is responsible for the functions of the LTE MME and it may include an AMF responsible for UE authentication, registration and mobility management, and an SMF responsible for PDU connection control.

The GW is responsible for relaying user data packets from the UE to a data network, packet filtering for delivering data packets to the addressed UE, and allocating an IP address to the UE. In the case of the 5G network, the UPF is responsible for the functions of a gateway such as relay of user data packets from the UE to the data network and packet filtering for delivery of the packets to the addressed UE. Unlike the LTE network, however, the IP address allocation function may be performed by the SMF. The PCRF is responsible for QoS and charging functions in the communication network by providing the GW with the QoS policy or charging policy, and the PCF may be configured to provide the UPF with QoS and charging policies such that the UPF performs QoS and charging functions via the SMF.

Although the description is made with an exemplary configuration of a 5G network, the present disclosure is applicable to the LTE network in a similar manner.

At operation 301, the UE 330 powers on and checks presence/absence of any SIM profile. If there is no existing SIM profile, the UE 330 checks the necessity of SIM profile provisioning and attempts to achieve PDU connectivity. If the UE 330 determines or is preconfigured to perform a PDU connectivity procedure, it may provide a list of available PLMNs discovered through cell search to an application or entity responsible for SIM profile provisioning. The UE 330 may select a PLMN for SIM profile provision from the available PLMN list.

The UE 330 may make a PLMN selection in accordance with a user input or a predetermined priority rule. For example, if the user has already determined a PLMN to subscribe, a provisioning application displays a list of PLMNs prompting the user to select a PLMN on a UI. Alternatively, if the information on a PLMN to subscribe is preconfigured, the UE 330 may select the corresponding PLMN. Alternatively, the UE 330 may select a PLMN with the strongest signal strength or randomly among the available PLMNs or a PLMN with the highest priority among the available PLMNs according to a preconfigured priority rule. The provisioning application is configured for use of a market server and thus may be called a market application.

At operation 302, the UE 330 may transmit an attach request message to a CPF 341 through the selected PLMN to request for connection to the network. The attach request message may include an attach type information indicating the attach request that is made for service plan subscription and SIM file provisioning. For example, the type information may be transmitted in the form of attach type='subscription.' In the UE 330, an NAS entity may transmit to an AS entity the attach request message including the information indicative of SIM provisioning as the cause of the request. The information indicative of SIM provisioning may be transmitted to a base station for use in selecting a CPF.

The attach request message may also include an identifier (ID) of the UE 330 (UE ID), e.g., IMEI and PEI. Alternatively, upon receipt of the attach request message, the CPF 341 may transmit a UE ID request message to the UE 330, at operation 303, and the UE 330 may transmit the UE ID to the CPF 341, at operation 304.

If the attach request message is received, the CPF 341 or authenticator (not shown) may perform an eUICC authentication procedure, at operation 305, for remote SIM provisioning.

After completing security key setup through the authentication procedure, the CPF 341 or the authenticator may transmit an attach accept message to the UE 330, at operation 306, to notify that the UE 330 has connected to the network successfully. The attach accept message may include the address of a subscription portal to access for subscription.

At operation 307, the UE 330 may transmit to the CPF 341 a PDU connection request message for establishing a PDU session for SIM provisioning. The PDU connection request message may include information on the type indicating that the cause of the PDU connection request is SIM provisioning. For example, the type information may be transmitted in the form of type='SIM provisioning.'

It may also be possible that the PDU connection request is piggybacked on the attach request message transmitted by the UE 330, at operation 302. If the attach request message includes attach type field set to 'subscription,' it may be possible to initiate the session establishment procedure of operation 307 for PDU connection for SIM provisioning even though there is no PDN connection request message transmission.

While the CPF 341 is processing the PDU connection request message, the SMF of the CPF 341 selects a UPF 342 in consideration that the request is made for SIM provisioning or the UPF 342 suitable for a selected network slice. The SMF may allocate an IP address to the UE 330.

If a UE manufacturer is identified based on the UE ID, e.g., IMEI and PEI, received from the UE 330 at the previous operation while processing the PDU connection request, the UPF 342 may make a configuration for access to the market server 350 pre-agreed with the UE manufacturer. The market server may be deployed per UE manufacturer. It may also be possible for the network operator to operate a separate market server to make a configuration for access to the corresponding market server regardless of the UE manufacturer information.

For access to the market server 350, it may be possible to configure an uplink/downlink packet filter with the market server address.

It may also be possible to make a configuration for allowing access only to the SM-DP+ server, SM-DS server for SM-DP+ discovery, DNS server, and subscription portal for SIM provisioning in the PDU session establishment procedure such that the established PDU connection is used only for the traffic related to the SIM provisioning. For example, it may be possible to configure uplink/downlink filters with the addresses for specific SIM provisioning (e.g., SM-DP+ server address, SM-DS server address, DNS server address, and subscription portal address) so as to allow only the communications attempted with the corresponding destination/source IP addresses.

After achieving the PDU connectivity, the market application of the UE 330 may transmit a subscription plan list request message to the market server 350, at operation 308, to request a list of the subscription plans of at least one network operator. The subscription plan list request message may include the information on the network to which the UE 330 has connected, e.g., access PLMN ID. The subscription plan list request message may also include at least one of the EID of the UE 330 and UE manufacturer information.

At operation 309, the market server 350 may provide a list of subscription plans arranged in an order of priorities based on the received access PLMN ID. For example, the market server 350 may present the subscription plans offered by a PLMN identified by the received access PLMN ID preferentially. In the case where the market application is a universal market application rather than a manufacturer-specific market application, the market server 350 may also consider the UE manufacturer information in allocating priorities to the subscription plans. For example, the market server 350 may give a priority to the subscription plans offered by a network operator having a contract with the UE manufacturer. At operation 310, the market server 350 may transmit prioritized subscription plans to the UE 330. For example, the market server 350 may transmit a predetermined number of subscription plans filtered according to priorities among the stored subscription plans.

At operation 311, the UE 330 may select at least one of the subscription plans transmitted by the market server 350 in response to a user input or according a preconfigured setting. At operation 312, the UE 230 may transmit to the market server 350 the selected subscription plan, e.g., at least one of PLMN ID and subscription plan identifier. At operation 313, the market server 350 may transmit to the UE 330 (particularly, the market application) the information on the provisioning server 360 for remote provisioning, e.g., SM-DS server or SM-DP+ server address of the selected PLMN.

At operation 314, the UE 330 may determine whether the currently connected PLMN (access PLMN) matches the PLMN selected at operation 311 (selected PLMN) (e.g., whether the two PLMNs are identical or associated with each other).

At operation 315, the provisioning server 360 may determine whether the access PLMN matches the PLMN selected at operation 311 (e.g., whether the two PLMNs are identical with or associated with each other).

If the access PLMN and the selected PLMN match each other, the UE 330 may connect to the provisioning server 360, using the provisioning server address acquired at operation 313, to download the eSIM profile, at operation 316.

Otherwise, if the access PLMN and the selected PLMN do not match each other, the market server 350 transmits to a PCF 343 the information on the service flow for SIM provisioning in order for the UE 330 to receive the provisioning data for the selected PLMN through the access PLMN, at operation 317. At operation 318, the PCF 343 may configure a packet filter to the UPF 342 via the CPF 341 to activate a bearer or a flow such that the UE 330 connects to the provisioning server 360 of the selected PLMN to download the eSIM profile.

Meanwhile, in order to measure the cost of the IP connectivity for SIM provisioning associated with the PLMN selected by the access PLMN, it may be possible to allocate a new charging ID, at operation 319, for the bearer activation or flow activation performed at operation 318. At operation 320, the UE 330 may download the eSIM profile through the newly established flow or bearer. The UPF 342 may map the charging ID and the EID to acquire the information on the data consumed for remote SIM provisioning by the EID. The UPF 342 may provide the selected PLMN with the corresponding billing information to charge the user for the data service directly or via the selected PLMN.

FIG. 4 is a diagram illustrating an internal operation of an eSIM-equipped UE for connecting to a market server and selecting a subscription plan according to an embodiment of the present disclosure.

Referring to FIG. 4, a UE 410 with no existing SIM profile accesses a market server 430 via a cellular network 421 and selects a subscription plan from a list provided by the market server 430 for provisioning an SIM profile corresponding to the selected subscription plan.

The UE 410 may include a market application 411 for managing a display/selection of subscription plans through communication with the market server 430, an eUICC 414, a local profile assistant (LPA) 413 for assisting communication with the network in the process of eSIM profile provisioning into the eUICC 414, and a modem 412. For example, at least one processor in the UE 410 may execute the market application 411 and the LPA 413, and a communication unit may execute the modem 412.

At operation 1, if the UE 410 powers on, the market application 411 detects absence of an SIM profile and requests to the modem 412 for information on PLMNs available for the UE 410 to select a PLMN to connect thereto. The modem 412 collects information on the available PLMNs by means of a certain scheme such as cell scanning, at operation 2, and sends an available PLMN list to the market application 411, at operation 3. The market application 411 displays the available PLMN list to the user, at operation 4.

If the user selects a PLMN, the market application 411 may request to the modem 412 to attach to the selected PLMN for SIM profile provisioning into the UE 410, at operation 5. That is, the market application 411 may request the modem 412 to attach the selected PLMN for subscription along with the selected PLMN ID. The modem 412 may attempt to attach to the cellular network 421 of the corresponding PLMN with a configuration of type='subscription', at operation 6. In the course of attaching to the communication network, the network operator may acquire the information on the UE manufacturer based on the IMEI or PEI of the UE 410 for use in configuring the communication network to make it possible to access the market server 430. The market application 411 may acquire the EID and information on the SM-DS+ server from the eUICC 414 by means of the LPA 413 and may transmit or use the EID and the SM-DS+ server information in communication with the market server 430, at operation 7.

Upon detection of successful network attachment and IP connectivity achievement, the market application 411 may access the market server 430, at operation 8, to request a list of the subscription plans. The subscription plan list request message transmitted by the market application 411 may include the ID of the access PLMN.

The market server 430 may transmit a subscription plan list to the market application 411 in response to the subscription plan list request message, at operation 9. For example, if the access PLMN ID is known to the market server 430, the market server 430 may generate the subscription plan list customized for the user in such a way of presenting the subscription plans offered by a corresponding PLMN with the best possible conditions or only the subscription plans offered by the PLMN identified by the access PLMN ID.

At operation 10, the market application 411 displays the subscription plan list to the user. The market application 411 may display the subscription plan list in such a way of presenting subscription plans per access PLMN ID or the subscription plans offered by the access PLMN to the user preferentially. For example, in the case that the subscription plan list is received from the market server 430 without transmitting an access PLMN ID to the market server 430, the market application 411 may display only the subscription plans offered by the PLMN identified by the access PLMN ID or the subscription plans offered by the access PLMN to the user preferentially. If the user selects a subscription plan, the market application 411 notifies the market server 430 of the selected subscription plan, at operation 11, and the market server 430 selects a provisioning server, e.g., SM-DP+ 440, based on the selected subscription plan and transmits the address of the selected provisioning server to the market application 411, at operation 12. The address of the SM-DP+ 440 may be sent to the eUICC 414 via the LPA 413, and the eUICC 414 may perform the SIM profile provisioning corresponding to the SM-DP+ 440 based on the address of the SM-DP+ 440, at operation 13.

Figure 5:
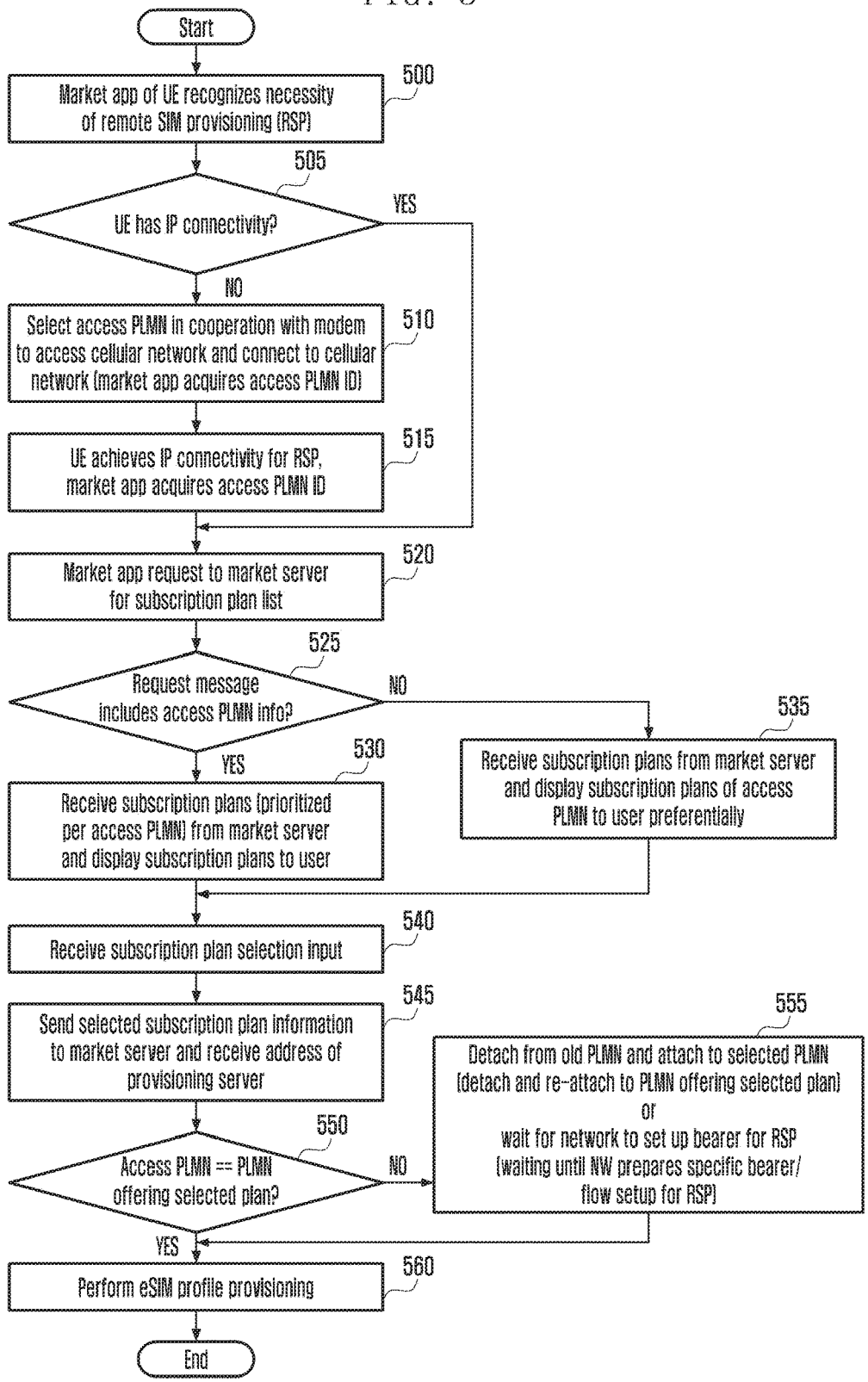
FIG. 5 is a flowchart illustrating a market server-assisted SIM profile provisioning method of a UE according to an embodiment of the present disclosure.

FIG. 5 is a flowchart illustrating a market server-assisted SIM profile provisioning method of a UE according to an embodiment of the present disclosure.

Referring to FIG. 5, if an eUICC-equipped UE in which a market application is installed for market server-assisted SIM profile provisioning powers on and detects absence of an SIM profile for attaching to a communication network, it (particularly, the market application of the UE) recognizes, at operation 500, the necessity of SIM profile provisioning.

The UE may determine, at operation 505, whether it has IP connectivity.

If it is determined that the UE has IP connectivity, the market application of the UE accesses a market server to request a list of subscription plans, at operation 520. If it is determined that the UE has no IP connectivity and thus needs to achieve IP connectivity through a cellular network, the market application of the UE may select a PLMN to access by means of a modem and connects to the cellular network, at operation 510. At this operation, the market application may acquire an access PLMN ID.

The UE may achieve IP connectivity for SIM profile provisioning in the access PLMN, and the market application may detect the IP connectivity achievement, at operation 515. Then, the market application may access the market server through the IP connectivity to request a list of the subscription plans, at operation 520.

The market application may transmit a subscription plan list request message with or without access PLMN ID and thus may determine, at operation 525, whether the subscription plan list request message includes an access PLMN ID.

If it is determined that the subscription plan list request message includes an access PLMN ID, the market application may receive the subscription plan list with the subscription plans prioritized based on the access PLMN ID from the market server and display the subscription plan list to the user, at operation 530.

Otherwise, if it is determined that the subscription plan list request message includes no access PLMN ID, the market application may receive a subscription plan list from the market server, prioritize the subscription plans in the received subscription plan list based on the pre-acquired access PLMN ID, and display the subscription plan list to the user, at operation 535.

At operation 540, the UE may receive a user input made for selecting at least one subscription plan from the displayed subscription plan list. It may also be possible that at least one subscription plan is selected according to the settings of the market application.

The market application may notify the market server of the selected subscription plan information and receive an SIM profile provisioning server address, e.g., SM-DP+ or SM-DS server address, from the market server in reply, at operation 545.

The UE may determine, at operation 550, whether the PLMN offering the selected subscription plan matches (is identical or associated with) the access PLMN.

If it is determined that the PLMN offering the selected subscription plan matches (is identical or associated with) the access PLMN, the market application, eUICC or LPA of the UE, may perform SIM profile provisioning using the received SIM profile provisioning server, at operation 560. The UE may connect to the cellular network based on the SIM profile that has been newly installed, as described above.

Otherwise, if it is determined that the PLMN offering the selected subscription plan does not match the access PLMN, the UE, at operation 555, may i) detach or de-register from the current access PLMN and reattach to the PLMN offering the selected subscription plan (according to the embodiment of FIGS. 2A and 2B) or ii) wait until a network of the access plan completes a bearer setup or a service flow setup for supporting SIM profile provisioning for the subscription plan offered by the selected PLMN (according to the embodiment of FIGS. 3A and 3B).

At operation 560, the market application, eUICC, or LPA of the UE may perform the SIM profile provisioning with the received SIM profile provisioning server address. The UE may reattach to the cellular network based on the SIM profile installed as described above.

Figure 6:
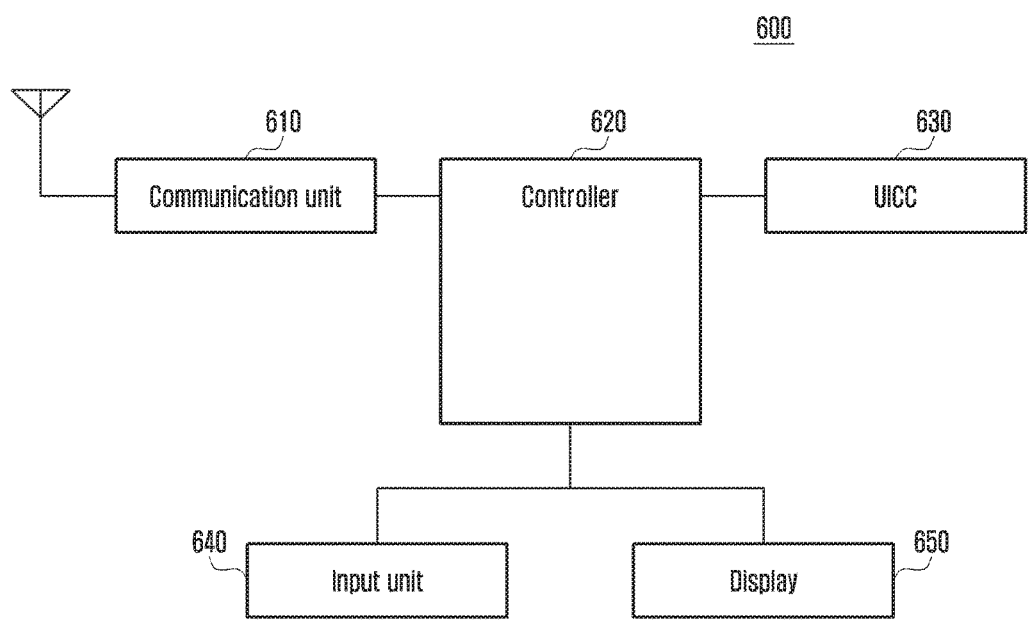
FIG. 6 is a block diagram illustrating a configuration of a UE according to an embodiment of the present disclosure.

FIG. 6 is a block diagram illustrating a configuration of a UE according to an embodiment of the present disclosure.

Referring to FIG. 6, a UE 600 may include at least one of a communication unit 610, a controller 620, a UICC 630, an input unit 640, and a display 650.

The communication unit 610 may transmit/receive signals under the control of the controller 620.

The UICC 630 may be an eUICC.

The input unit 640 may receive a user input under the control of the controller 620, and the display 650 may display a user interface under the control of the controller 620. The input unit 640 and the display 650 may be implemented in the form of a touchscreen.

The controller 620 may include at least one processor. The controller 620 may control the operation of the UE according to an embodiment of the present disclosure.

For example, the controller 620 may control the communication unit 610 to transmit a message to a market server to request for information on the subscription plans offered by at least one network operator and receive a response message including the information on the subscription plans offered by the at least one network operator from the market server and control the display 650 to display the subscription plan list generated based on the information on the subscription plans offered by the at least one network operator. The subscription plan list may be generated such that the subscription plans are listed in an order of priority based on the connected network operator information.

According to an embodiment of the present disclosure, if the request message includes the information on the network operator to which the UE is connected, the subscription plan information of the at least one connected network operator may be assigned a priority based on the information of the network operator to which the UE is connected.

According to an embodiment of the present disclosure, if the request message includes no information on the network operator to which the UE is connected, the UE may assign a priority to the subscription plan information of the at least one network operator.

The controller 620 may control the communication unit 610 to receive a user input made for selecting a subscription plan from the displayed subscription plan list.

The controller 620 may transmit the selected subscription plan information to the market server and receive an address of a profile server corresponding to the selected subscription plan from the market server.

According to an embodiment of the present disclosure, if the network operator offering the selected subscription plan matches the network operator to which the UE is connected, the controller 620 may download the profile using the received profile server address information.

According to an embodiment of the present disclosure, if the network operator offering the selected subscription plan does not match the network operator to which the UE is connected, the controller 620 may control the UE to detach from the connected network operator and attempt to attach to the network operator offering the selected subscription plan to download the profile using the received profile server address information.

According to an embodiment of the present disclosure, if the network operator offering the selected subscription plan does not match the network operator to which the UE is connected, the controller 620 may control the UE to wait until the network operator to which the UE is connected establishes a bearer with the network operator offering the selected subscription plan and, if the bearer is established, then download the profile using the received profile server address information.

Figure 7:
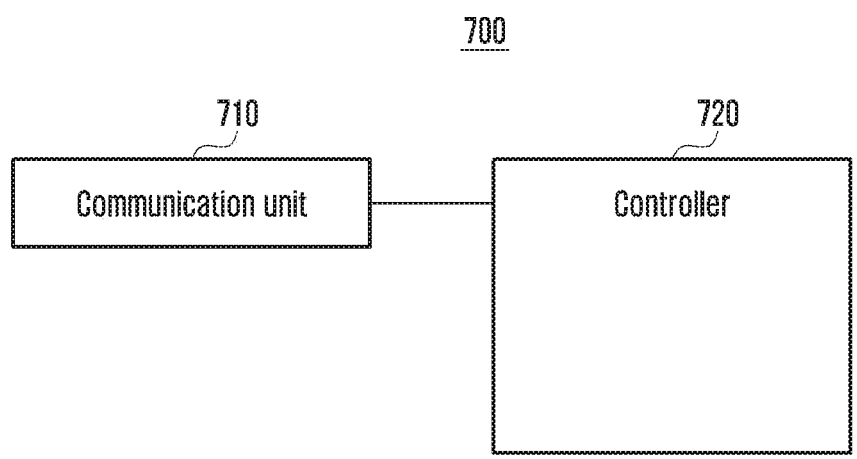
FIG. 7 is a block diagram illustrating a configuration of a market server according to an embodiment of the present disclosure.

FIG. 7 is a block diagram illustrating a configuration of a market server according to an embodiment of the present disclosure.

Referring to FIG. 7, a market server 700 may include a communication unit 710 and a controller 720.

The communication unit 710 may transmit and receive signals under the control of the controller 720.

The controller 720 may include at least one processor. The controller 720 may control the operation of the market server according to an embodiment of the present disclosure.

According to an embodiment of the present disclosure, the controller 720 may control the communication unit 710 to receive a message requesting information on the subscription plans offered by at least one network operator from a UE. The request message may or may not include the information on the network operator to which the UE is connected.

The controller 720 may control the communication unit 710 to transmit to the UE a response message including the information on the subscription plans offered by the at least one network operator in response to the request message. If the request message includes the information on the network operator to which the UE is connected, the controller 720 may assign a priority to the information on the subscription plans offered by the at least one network operator based on the information on the network operator to which the UE is connected and transmit the subscription plan information to the UE.

As described above, the profile provisioning method and apparatus of the present disclosure is advantageous in terms of facilitating provisioning an SIM profile by allowing a user to access a market server and select one of the payment plans placed by network operators participating in the market.

Also, the profile provisioning method and apparatus of the present disclosure is advantageous in terms of an improved user interface by provisioning an SIM profile in an integrated and automated manner.

Also, the profile provisioning method and apparatus of the present disclosure is advantageous in terms of promoting participation of network operators in a payment plan market by configuring a market server to display preferentially the payment plans offered by a network operator of the user accessing the market server.

The components and modules constituting each of the network entities including base stations and UEs that have been described above may be enabled and operated using hardware circuitry such as complementary metal oxide semiconductor-based logic circuitry, firmware, software, and/or any combination of the hardware, firmware, and/or software embodied in a machine readable medium. For example, the various electrical structures and methods may be embodied using transistors, logic gates, and electrical circuits, such as an application specific integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A profile provisioning method of a terminal, the method comprising:
    transmitting, to a market server, a request message including information on an access public land mobile network (PLMN);
    receiving, from the market server, a response message including information on a plurality of subscription plans offered by a plurality of operators; and
    displaying a subscription plan list including the plurality of subscription plans offered by the plurality of operators,
    wherein the plurality of subscription plans offered by the plurality of operators are arranged in an order of their corresponding priorities in the subscription plan list,
    wherein the plurality of subscription plans offered by the plurality of operators are prioritized based on the information on the access PLMN, and
    wherein a subscription plan offered by an operator corresponding to the access PLMN has a higher priority than all other subscription plans among the plurality of subscription plans offered by the plurality of operators.

2. The method of claim 1,
    wherein the information on the access PLMN includes a PLMN ID of an operator to which the terminal is accessed.

3. The method of claim 1,
    wherein the request message further includes terminal manufacturer information, and
    wherein the subscription plans are prioritized based on the information on the access PLMN and the terminal manufacturer information.

4. The method of claim 1, further comprising receiving an input for selecting a subscription plan from the subscription plan list.

5. The method of claim 4, further comprising:
    transmitting information on the selected subscription plan to the market server; and
    receiving an address of a profile server corresponding to the selected subscription plan from the market server.

6. The method of claim 5, further comprising downloading a profile using the address of the profile server based on an operator, offering the selected subscription plan, which matches the operator to which the terminal is accessed.

7. The method of claim 5, further comprising:
    detaching from the operator to which the terminal is accessed based on an operator, offering the selected subscription plan, which does not match the operator to which the terminal is accessed;
    attempting to access to the operator offering the selected subscription plan; and
    downloading a profile using the address of the profile server.

8. The method of claim 5, further comprising:
    waiting for the operator to which the terminal is accessed to establish a bearer with the operator, offering the selected subscription plan, which does not match the operator to which the terminal is accessed; and
    downloading a profile using the address of the profile server after the bearer is established.

9. A terminal comprising:
    a universal integrated circuit card (UICC);
    a display;
    a transceiver configured to transmit and receive signals; and
    at least one processor configured to:
        control the transceiver to transmit, to a market server, a request message including information on an access public land mobile network (PLMN),
        control the transceiver to receive, from the market server, a response message including information on a plurality of subscription plans offered by a plurality of operators, and
        control the display to display a subscription plan list including the plurality of subscription plans offered by the plurality of operators,
    wherein the plurality of subscription plans offered by the plurality of operators are arranged in an order of their corresponding priorities in the subscription plan list,
    wherein the plurality of subscription plans offered by the plurality of operators are prioritized based on the information on the access PLMN, and
    wherein a subscription plan offered by an operator corresponding to the access PLMN has a higher priority than all other subscription plans among the plurality of subscription plans offered by the plurality of operators.

10. The terminal of claim 9,
    wherein the information on the access PLMN includes a PLMN ID of an operator to which the terminal is accessed.

11. The terminal of claim 9,
    wherein the request message further includes terminal manufacturer information, and
    wherein the subscription plans are prioritized based on the information on the access PLMN and the terminal manufacturer information.

12. The terminal of claim 9, further comprising:
    an interface,
    wherein the at least one processor is further configured to receive an input selecting a subscription plan from the subscription plan list via the interface.

13. The terminal of claim 12, wherein the at least one processor is further configured to:
    control the transceiver to transmit information on the selected subscription plan to the market server, and control the transceiver to receive an address of a profile server corresponding to the selected subscription plan from the market server.

14. The terminal of claim 13, wherein the at least one processor is further configured to control the transceiver to download a profile using the address of the profile server based on an operator, offering the selected subscription plan, which matches the operator to which the terminal is accessed.

15. The terminal of claim 13, wherein the at least one processor is further configured to:
control the terminal to detach from the operator to which the terminal is accessed based on an operator, offering the selected subscription plan, which does not match the operator to which the terminal is accessed,
attempt to access to the operator offering the selected subscription plan, and
download a profile using the address of the profile server.

16. The terminal of claim 13, wherein the at least one processor is further configured to:
control the terminal to wait for the operator to which the terminal is accessed to establish a bearer with the operator offering the selected subscription plan, which does not match the operator to which the terminal is accessed, and
download a profile using the address of the profile server after the bearer is established.

* * * * *